United States Patent Office 3,274,136
Patented Sept. 20, 1966

3,274,136
PREPARATION OF REINFORCED RESINS USING GLASS FIBERS COATED WITH PLASTICIZED VINYL CHLORIDE POLYMERS
William K. Glesner, Clifford F. Thompson, and Donald P. Kubisiak, Midland, Mich., assignors to The Dow Chemical Company, Midland, Mich., a corporation of Delaware
No Drawing. Filed Dec. 7, 1962, Ser. No. 242,920
16 Claims. (Cl. 260—23.5)

This invention relates to an improved process for producing reinforced resin laminates. More particularly, it relates to an improved process for preparing rigid, transparent, vinyl chloride resin laminates having fibrous glass reinforcing material pre-coated with a vinyl chloride polymer embedded in the polymeric product.

Fluid dispersions, plastisols, or compositions, having a low viscosity and which are suitable for use as laminating compositions, and which will rapidly set up by polymerization upon heating to form rigid products having good flexural strength and uniformity of flex strength across the laminate, can readily be prepared by blending finely divided plastisol grade vinyl chloride polymers with two or more ethylenically unsaturated polymerizable monomers, one of which is a monovinyl aromatic hydrocarbon of the benzene series having the vinyl radical directly attached to a carbon atom of the benzene nucleus and containing from 8 to 10 carbon atoms in the molecule, and the other being an ester of fumaric acid or an ester of acrylic or methacrylic acid as hereinafter defined.

It has been found that the unsaturated esters of fumaric acid or of acrylic and methacrylic acids, in admixture with the vinyl aromatic hydrocarbon monomers, have a surprising action of increasing the fluidity of the dispersions of the polyvinyl chloride compositions or plastisols, as compared to the fluidity of dispersions of the polyvinyl chloride in the monovinyl aromatic hydrocarbon monomer alone, and permit the preparation of so-called "low-pressure" laminates. The presence of the esters also leads to a desirable increase in the transparency of the cured polymers. It has further been found that small amounts of one or more polyethylenically unsaturated organic compounds which are polymerizable with the monovinyl aromatic hydrocarbons may also be advantageously included to increase the rate of cure of such polymerizable fluid compositions.

Generally, such compositions are reinforced with glass fibers in the form of continuous strands, textiles, or preferably in chopped strands formed into mats.

Such mats are generally formed by combining extruded glass filament into strands, by methods well known in the art and subsequently chopping the strands into the desired reinforcing lengths.

Mats thus made lack sufficient strength and rigidity for further handling unless a binder for the glass fiber strands is employed. Commonly used binders are polymeric materials applied to such glass fiber strands in the form of water emulsions, solvent solutions, or powders. Several different kinds of synthetic materials have been used as the binder, with polyester, melamine and phenolic resins being most commonly employed. The water emulsions and solvent solutions of the polymeric materials are generally sprayed onto the mats in desired amounts, whereas the powders, generally of a 40–140 mesh size are generally dusted onto the mats. Both the glass fibers and the polymeric binders are generally fed at definite rates in a predetermined cycle best suited for the particular mat being formed. After depositing the binder, the mat is generally heated to a temperature sufficient to cause the binder to adhere to the glass fibers or to polymerize in the mat. On cooling, the mat generally has sufficient strength for handling.

Desirable reinforcing mats must contain a uniform glass fiber and binder dispersion throughout the mat, a high degree of strand integrity, and even wet-out of the mat with the impregnating or coating resin used. This last factor is of great importance in laminating operations, for any incomplete wet-out of the resin into the glass fiber mat results in poor appearance and strength of the laminate. Wet out of the mat should, for best results, be sufficient so that the glass fibers and binders are invisible or nearly invisible in the laminate.

Heretofore, the resins suitable for use as mat binders in reinforced resin laminates were generally narrowed to the several presently recognized in the art. Such binders, however, are not always satisfactory with all types of laminating resins, and are particularly disadvantageous for preparing the rigid vinyl chloride resin laminates described herein, because of incomplete wet-out of the cured polymer coating with the mat with accompanying formation of areas of opaqueness, numerous bubbles and blisters, and areas of scorched appearance in the cured resin laminate.

Accordingly, it is an object of the present invention to provide a process for preparing improved rigid, transparent, glass fiber reinforced vinyl chloride resin laminates.

Other and related objects will become apparent from the following description of the invention.

The foregoing and related objects can be attained by means of a process comprising the preparation of resin laminates by:

(I) Uniformly coating glass fiber reinforcing material with from between about 3 and 15 weight percent, based on the weight of the reinforcing material, of a homogeneous polymeric binder composed of (1) between about 50 and 80 weight percent of a vinyl chloride polymer containing at least about 85 weight percent of vinyl chloride in the polymer molecule and (2) complementarily between about 50 and 20 weight percent of a plasticizer for the vinyl chloride polymer;

(II) Impregnating the coated reinforcing material with a polymerizable fluid composition comprising from 40 to 60 weight percent of a vinyl chloride polymer containing at least about 95 weight percent of polyvinyl chloride in the polymer molecule and intimately incorporated with from 60 to 40 weight percent of a monomeric composition composed essentially of (A) from 60 to 95 weight percent of a monovinyl aromatic hydrocarbon of the benzene series containing from 8 to 10 carbon atoms in the molecule; (B) at least about 5 weight percent of an unsaturated ester selected from the group consisting of (a) fumaric acid esters having the general formula

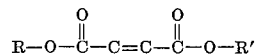

wherein R and R' each represent an alkyl radical containing from 2 to 8 carbon atoms, (b) acrylic acid and methacrylic acid esters having the general formula

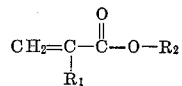

wherein $R_1$ represents hydrogen and the methyl radical and $R_2$ is a member of the group consisting of cyclohexyl and alkyl radicals containing from 4 to 12 carbon atoms; and (C) not more than about 10 weight percent of a polyethylenically unsaturated aliphatic organic compound copolymerizable with the monovinyl aromatic compound;

and (III) Curing the composition by polymerization of the monomers.

Any conventionally prepared fibrous glass reinforcing material including glass fiber fabric, rovings or other fibrous forms may be used for the purposes of the present invention. It is particularly advantageous, however, to use glass fiber mats composed of individual glass fiber strands having a length of between about 1 and 3 inches and wherein each strand is composed of between about 30 and 100 individual glass fiber filaments and preferably about 50 individual glass fiber filaments which are initially free from polymeric bonding materials.

The polymer binder which is useful for the purposes of the present invention is advantageously composed of (1) between about 50 and 80 weight percent of a vinyl chloride polymer containing at least about 85 weight percent of polyvinyl chloride in the polymer molecule, with any remainder being a polymer or interpolymer of one or more monoethylenically unsaturated copolymerizable materials including vinyl acetate, vinyl propionate, methyl acrylate, vinylidene chloride, acrylonitrile, among many others; and (2) complementarily between about 50 and 20 weight percent of a plasticizer for the vinyl chloride polymer. As purely exemplary of such plasticizers are: dioctyl phthalate, diisobutyl adipate, tricresyl phosphate, and epoxidized soybean oils, among many others well known in the art.

Such polymeric binder may be prepared and applied to the glass fiber reinforcing material by any procedure known to those skilled in the art, i.e. from water emulsions, solvent solutions, or in the form of powders. It has been found particularly advantageous however, when using a glass fiber mat of the type described herein, to apply an aqueous dispersion of vinyl chloride polymer and plasticizer to both sides of the unbonded mat until such mat contains from between about 3 and 15 weight percent of the homogeneous polymeric binder following devolatilization of the aqueous constituent of the latex.

The polymeric binders described herein must be applied to the glass-fiber reinforcing material in the stated amounts, and must be of the stated composition to provide required wet-out of the subsequently applied polymerizable fluid compositions through the reinforcing material, with resultant formation, following polymerization of the monomeric constituents of such polymerizable fluid compositions, of the improved, high-strength, transparent resin laminates.

The vinyl chloride polymers to be employed in the polymerizable fluid compositions described herein can be polyvinyl chloride or copolymers of vinyl chloride with small amounts, e.g. 5 weight percent or less, of other polymerizable materials such as vinyl acetate, vinyl propionate, methyl acrylate, butyl acrylate, methyl methacrylate, lauryl methacrylate, vinylidene chloride and the like. It is desirable that the polyvinyl chloride or vinyl chloride polymers be of high molecular weight and in finely divided form, i.e., of plastisol grade consisting of solid dense particles of average diameters in the range of from about 0.5 to about 2 microns. Thus, the vinyl chloride polymers employed herein include homopolymers of vinyl chloride and copolymers of at least 95 percent by weight of vinyl chloride with not more than 5 percent by weight of one or more other monoethylenically unsaturated organic compounds copolymerizable therewith.

The vinyl chloride polymer or polyvinyl chloride can be used in amounts corresponding to from 40 to 60 percent by weight of the sum of the weights of the polymer and the monomers initially used, and correspondingly the monomers, i.e., the sum of the weights of the monovinyl aromatic hydrocarbon, the unsaturated esters, and the polyethylenically unsaturated organic compounds are employed in amounts of from 60 to 40 percent by weight of the dispersion.

Exemplary of the monovinyl aromatic hydrocarbon monomers are: styrene, ortho-, meta- or para-vinyltoluene or a mixture of two or more of such isomers, vinylxylene or ethylvinylbenzene, containing from 8 to 10 carbon atoms in the molecule, and is employed in amounts corresponding to from 60 to 95 percent by weight of the sum of the weights of the monomers.

The unsaturated ester can be (a) an ester of fumaric acid having the general formula:

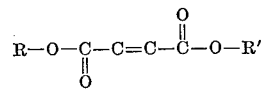

wherein R and R' each represents an alkyl radical containing from 2 to 8 carbon atoms, or (b) an ester of acrylic or methacrylic acid having the general formula:

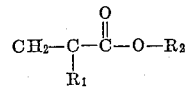

wherein $R_1$ represents hydrogen or the methyl radical and $R_2$ is a member of the group consisting of the cyclohexyl radical and alkyl radicals containing from 4 to 12 carbon atoms.

Examples of esters embraced by the above formula are diethyl fumarate, dibutyl fumarate, dihexyl fumarate, di-(2-ethylhexyl)fumarate, butyl acrylate, hexyl acrylate, 2-ethylhexyl acrylate, lauryl acrylate, butyl methacrylate, hexyl methacrylate, 2-ethylhexyl methacrylate, cyclohexyl acrylate and cyclohexyl methacrylate.

The esters of fumaric acid, acrylic acid and/or methacrylic acid can be used in amounts corresponding to from 5 to 40 percent by weight of the sum of the weights of the ester and the monovinyl aromatic hydrocarbon employed. It may be mentioned that best results are usually obtained when the minimum proportion of the unsaturated ester employed is within the range of from 5 to 10 percent and is directly proportional to the amount of vinyl chloride polymer used (within the range of from 40 to 60 percent by weight of the compositions) i.e., when 60 percent polyvinyl chloride is used, the higher amount of ester is preferable.

It has been found that the addition of not more than about 10 weight percent of a polyethylenically unsaturated aliphatic organic compound as hereinafter defined, to the polymerizable fluid composition prior to application of the same to the reinforcing material, will effectively increase the rate of polymerization of the monomeric constituents of such compositions following application to the reinforcing material, with no deleterious effects on the strength of appearance of the so-formed resin laminate. Amounts greater than about 10 weight per cent, however, may reduce the transparency and/or the physical strength of such laminate. Such polyethylenically unsaturated organic monomers include (a) esters of monobasic unsaturated aliphatic acids such as acrylic acid and methacrylic acid and a hydroxy compound of the group consisting of vinyl alcohol, allyl alcohol, methallyl alcohol, glycerol, 1,3-propanediol and glycols and polyglycols having the general formula $$HO-(C_nH_{2n}O)_m-H$$

wherein $n$ is a whole number from 2 to 3 and $m$ is an integer from 1 to 14 with the proviso that said polyglycols have an average molecular weight not substantially greater than 600 such as the di-, tri-, tetra-, penta-, and up to tetra-decyl ethylene glycols and the di-, tri-, tetra-, penta-, and up to decyl propylene glycols, (b) esters of polybasic aliphatic acids such as maleic acid, fumaric acid, itaconic acid and citraconic acid and glycols and polyglycols having the general formula given above, and (c) unsaturated polyesters of maleic acid or fumaric acid and glycols having the general formula $$HO-(C_nH_{2n}O)_m-H$$

wherein $n$ is a whole number from 2 to 3 and $m$ is an integer from 1 to 2, which unsaturated polyesters have a molecular weight between about 200 and 2000. Exemplary of such materials useful for the present invention are: allyl acrylate, ethylene glycol dimethacrylate, among many others.

In forming the polymerizable fluid compositions described herein the polyvinyl chloride in finely divided form is blended or mixed with the monovinyl aromatic hydrocarbon and the unsaturated ester or polyethylenically unsaturated aliphatic organic compounds, or a mixture of such materials, in any usual way, together with pigments, stabilizers, dyes, antioxidants, or inhibitors, if desired. It may be mentioned that best results are obtained when a small amount of a usual thermal stabilizing agent for polyvinyl chloride such as dibutyl tin dilaurate, bariumcadmium soaps, or organo-tin mercaptides is included.

The ingredients are preferably blended with one another at temperatures between about 0° C. and 25° C. The compositions can have an absolute viscosity of from about 30 to 3000, preferably from 30 to 500, centipoises at 0° C. Such fluid compositions or plastisols can readily be used to coat or impregnate the plasticized vinyl chloride coated mat of the present invention using any procedure well known in the art.

In the curing of the compositions by polymerization of the monomer, it is preferable to incorporate into the polymerizable composition described herein prior to the application of said polymerizable fluid composition to the plasticized vinyl chloride coated mat, a small amount, e.g., from 0.2 to 2 percent by weight of the monomer of a peroxide polymerization initiator or catalyst such as benzoyl peroxide, acetyl peroxide, tert.-butyl perbenzoate, tert.-butyl peracetate, di-tert.-butyl diterephthalate, lauroyl peroxide or dicumyl peroxide. In order to inhibit premature polymerization of the monomers a polymerization inhibitor such as hydroquinone may be added.

It is important that the temperature and time of curing the plastisol be accomplished by heating the coated reinforced material as described herein in an oven or between platens of a press or in a mold at temperatures between about 100° and 170° C., preferably from 135° and 160° C., for a period of time of from about 5 to 30 minutes depending in part upon the thickness of the section to be cured and in part upon the peroxide employed as curing agent. Heating for prolonged periods of time at temperatures which result in deterioration or discoloring of the polymeric product is to be avoided.

The following example, wherein all parts and percentages are to be taken by weight, illustrates the present invention but is not to be construed as limiting its scope.

*Example*

A glass fiber reinforced resin laminate was prepared as follows. A mat of chopped microstrand fiberglass coated with a polyester binder and weighing 2 oz. per square foot (Fiberglass mat MS (384) HSB 2) was placed in a gas fired oven at 600° C. until such polyester binder was volatilized. Approximately one hour was required to remove substantially all of such binder and to produce an essentially non-bonded glass fiber mat having approximately 50 individual strands, each strand being from about 1 to 3 inches in length.

The non-bonded glass fiber mat was subsequently supported between two overlaying sections of a wire screen, having a mesh size of about 1 inch. Both sides of the glass-fiber mat were then sprayed with an aqueous polymeric binder prepared by blending 31.4 grams of an aqueous emulsion containing 75 weight percent of the plasticizer, dioctyl phthalate, with 105 grams of an aqueous emulsion containing 50 weight percent of polyvinyl chloride, and subsequently diluting the mixture with 625 grams of water to produce an aqueous dispersion having 10 weight percent solids therein. The mat was then placed in an oven at 300° F. for a period of about 10 minutes and subsequently cooled to normal room temperature. After cooling, the individual strands of the mat were found to be firmly and uniformly bound together. The binder content of such mat was found to be 9.3 weight percent based on the total weight of the mat.

Thereafter, a polymerizable fluid composition was prepared as follows. A charge of 55 parts by weight of finely divided polyvinyl chloride of plastisol grade was blended with 18 parts by weight of diethyl fumarate and 27 parts by weight of vinyltoluene at a temperature of about 0° C. The fluid dispersion had an absolute viscosity of about 150 centipoises at 0° C. as determined by a Brookfield viscosimeter. The vinyltoluene employed in the experiment was a mixture of approximately 65 percent by weight of meta-vinyltoluene and 35 percent of para-vinyltoluene. There was added to the dispersion of the polyvinyl chloride in the monomers 1 part by weight of dibutyl tin dilaurate and 0.5 part by weight of dicumyl peroxide, with stirring. The resulting mixture was stirred under vacuum to remove dissolved air.

A portion of the dispersion was then poured into an aluminum frame mold laid upon a film of polyethylene terephthalate to form a layer about 4 x 4 inches square by ⅛ inch deep. The mat of bonded chopped strand fiberglass, as described herein, was placed on top of and allowed to settle into the dispersion and covered with a film of polyethylene terephthalate. The assembly was then placed between platens wherein it was cured by heating at a temperature of about 150° C. for a period of 15 minutes. The cured product was cooled and removed from the mold. It was a transparent, rigid molding free from bubbles, blisters and scorched areas, having the fiberglass embedded therein in amount corresponding to about 20 weight percent by total weight of the molding.

A similar desirable resin laminate was prepared whereing the mat of chopped microstrand fiberglass as described herein was replaced by a smilar mat which had not previously been coated with a polymeric binder, and which subsequently was not heat treated in the gas fired oven as previously described.

Resin laminates having the desirable properties described herein were also prepared, by the process of the present invention, wherein the diethylfumarate constituent of the fluid composition was replaced by substantially equivalent amounts of 2-ethyl hexyl acrylate or butyl methacrylate.

Other resin laminates having the desirable properties described herein were prepared by the process of the present invention wherein the plasticizer constituent of the polymeric binder was replaced by substantially equivalent amounts of one of a series of plasticizers for vinyl chloride polymers including, an eopxidized soybean oil, tricresyl phosphate, and diisobutyl adipate.

Still other resin laminates, having the previously described desirable properties were prepared by the process as described herein, wherein the solids constituent of the polymeric binder composition was composed of (1) between about 50 and 80 weight percent of polyvinyl chloride, and (2) complementarily between 50 and 20 weight percent of the plasticizer dioctyl phthalate.

Additionally, resin laminates having equally desirable properties are prepared by means of the process of the present invention wherein; glass fiber reinforcing material, as described herein, is coated with from between 3 and 15 weight percent of a polymeric binder composed of (1) between about 50 and 80 weight percent of a vinyl chloride polymer containing at least about 85 weight percent of polyvinyl chloride as described herein, and (2) complementarily between about 50 and 20 weight percent of a plasticizer for such vinyl chloride polymer; the bonding reinforcing material is then coated with a polymerizable fluid composition as described herein; and such composition is cured by polymerization of the monomers.

Equally desirable results are obtained wherein the polymerizable fluid composition additionally contains up to about 10 weight percent of a polyethylenically unsaturated aliphatic organic compound as described herein.

In contrast, a molding was similarly prepared by placing a mat of the chopped microstrand fiber glass coated with a polyester binder in a portion of the fluid dispersion composed of 55 parts by weight of finely divided polyvinyl chloride of plastisol grade, 18 parts by weight of diethyl fumarate, and 27 parts by weight of vinyl toluene as described herein. The resulting material was a rigid molding having many opaque blotches, a great many bubbles and blisters indicative of poor wet-out of the fluid composition with the glass fiber reinforcing mat, and areas having a noticeably scored appearance.

Resin laminates having similar undesirable appearance are also prepared when the polymeric binder of the present invention is applied to glass fiber reinforcing material having substantial amounts of a polyester bonding material coated thereon.

What is claimed is:
1. The process for preparing reinforced resin laminates comprising the sequential steps of:
   (I) uniformly coating unsized glass fiber reinforcing material with from between about 3 and 15 weight percent based on the weight of said reinforcing material of a homogeneous polymeric binder composed of (1) between about 50 and 80 weight percent of a vinyl chloride polymer containing at least about 85 weight percent of vinyl chloride in the polymer molecules, and (2) complementarily between about 50 and 20 weight percent of a plasticizer for said vinyl chloride polymer and subsequently fusing said polymeric binder to said reinforcing material;
   (II) impregnating said coated reinforcing material with a polymerizable fluid composition comprising from 40 to 60 weight percent of vinyl chloride polymer containing at least about 95 weight percent of vinyl chloride in the polymer molecules intimately incorporated with from 60 to 40 weight percent of a monomeric composition composed essentially of (A) from 60 to 95 weight percent of a monovinyl aromatic hydrocarbon of the benzene series containing from 8 to 10 carbon atoms in the molecule, and (B) at least 5 weight percent of an unsaturated ester selected from the group consisting of (a) fumaric acid esters having the general formula:

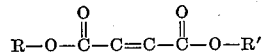

wherein R and R' each represents an alkyl radical containing from 2 to 8 carbon atoms, and (b) acrylic and methacrylic acid esters having the general formula:

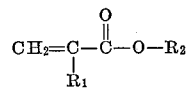

wherein $R_1$ represents hydrogen and the methyl radical and $R_2$ is a member of the group consisting of cyclohexyl and alkyl radicals containing from 4 to 12 carbon atoms; and
   (III) curing the composition by polymerization of the monomers in the presence of from about 0.2 to 2 percent by weight of an organic peroxide polymerization catalyst.

2. The process of claim 1, wherein said glass fiber reinforcing material is a mat composed of glass fiber strands of between 1 and 3 inches in length, wherein each of said glass fiber strands is comprised of about 50 individual glass fiber filaments.

3. The process of claim 1, wherein said reinforcing material is sprayed with an aqueous dispersion of said polymeric binder.

4. The process of claim 1, wherein said vinyl chloride polymer constituent of said polymeric binder is polyvinyl chloride.

5. The process of claim 4, wherein said plasticizer for said vinyl chloride polymer is dioctyl phthalate.

6. The process of claim 4, wherein said plasticizer for said vinyl chloride polymer is an epoxidized soybean oil.

7. The process of claim 4, wherein said plasticizer for said vinyl chloride polymer is tricresyl phosphate.

8. The process of claim 4, wherein said plasticizer for said vinyl chloride polymer is diisobutyl adipate.

9. The process of claim 1, wherein the vinyl chloride polymer constituent of said polymerizable fluid composition is polyvinyl chloride, and said monovinyl aromatic hydrocarbon of the benzene series is vinyltoluene.

10. The process of claim 9, wherein said unsaturated ester is diethyl fumarate.

11. The process of claim 9, wherein said unsaturated ester is an ester of acrylic acid.

12. The process of claim 11, wherein said ester of acrylic acid is 2-ethylhexyl acrylate.

13. The process of claim 9, wherein said unsaturated ester is an ester of methacrylic acid.

14. The process of claim 13, wherein said ester of methacrylic acid is butyl methacrylate.

15. The process of claim 1, wherein said polymerizable fluid composition is a plastisol having an absolute viscosity between 30 and 2500 centipoises at 0° C.

16. The process of claim 1, wherein said polymerizable fluid composition contains not more than 10 weight percent of a polyethylenically unsaturated organic monomer which is copolymerizable with said monovinyl aromatic hydrocarbon.

References Cited by the Examiner

UNITED STATES PATENTS

| | | | |
|---|---|---|---|
| 2,618,621 | 11/1952 | Burt | 260—31.8 |
| 2,951,772 | 9/1960 | Marzocchi et al. | 117—126 |
| 3,012,001 | 12/1961 | Smith | 260—31.8 |
| 3,125,546 | 3/1964 | Pinner | 260—884 |
| 3,133,825 | 5/1964 | Rubens | 260—884 |
| 3,157,713 | 11/1964 | Leese | 260—884 |

LEON J. BERCOVITZ, *Primary Examiner.*

R. A. WHITE, *Assistant Examiner.*